(12) United States Patent
Watabe et al.

(10) Patent No.: US 10,457,760 B2
(45) Date of Patent: *Oct. 29, 2019

(54) PROCESS FOR PRODUCING LIQUID COMPOSITION AND PROCESS FOR PRODUCING CATALYST LAYER-FORMING COATING LIQUID

(71) Applicant: AGC Inc., Chiyoda-ku (JP)

(72) Inventors: Hiroyuki Watabe, Chiyoda-ku (JP); Hirokazu Wakabayashi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,578

(22) Filed: Feb. 26, 2018

(65) Prior Publication Data

US 2018/0186913 A1 Jul. 5, 2018

Related U.S. Application Data

(63) Continuation of application No. PCT/JP2016/075350, filed on Aug. 30, 2016.

(30) Foreign Application Priority Data

Aug. 31, 2015 (JP) ................................. 2015-171321

(51) Int. Cl.
*H01M 4/86* (2006.01)
*H01M 4/88* (2006.01)
(Continued)

(52) U.S. Cl.
CPC ............ *C08F 214/262* (2013.01); *C08F 8/00* (2013.01); *C08F 16/24* (2013.01); *C08J 3/05* (2013.01);
(Continued)

(58) Field of Classification Search
CPC ............ H01M 4/8663; H01M 4/8828; H01M 4/8882; H01M 4/926; H01M 4/8668;
(Continued)

(56) References Cited

U.S. PATENT DOCUMENTS

2002/0002240 A1    1/2002 Michot et al.
2006/0014886 A1*   1/2006 Hintzer .................. C08F 214/18
                                                   524/544

(Continued)

FOREIGN PATENT DOCUMENTS

JP    2003-292532    10/2003
JP    2008-506834     3/2008
(Continued)

OTHER PUBLICATIONS

International Search report dated Nov. 29, 2016 in PCT/JP2016/075350, filed on Aug. 30, 2016.

*Primary Examiner* — Michael Bernshteyn
(74) *Attorney, Agent, or Firm* — Oblon, McClelland, Maier & Neustadt, L.L.P.

(57) ABSTRACT

A process for producing a liquid composition, which includes holding a fluorinated polymer having —$SO_2F$ groups at from 140 to 160° C. for at least 45 minutes, cooling it to less than 110° C. at a rate of at least 50° C./min, converting the —$SO_2F$ groups in the fluorinated polymer to ion exchange groups to obtain a fluorinated polymer having ion exchange groups, and mixing the fluorinated polymer having ion exchange groups and a liquid medium.

6 Claims, 1 Drawing Sheet

(51) Int. Cl.

| | | |
|---|---|---|
| *C08F 16/24* | (2006.01) | |
| *C08J 3/03* | (2006.01) | |
| *C08F 8/00* | (2006.01) | |
| *C08J 3/05* | (2006.01) | |
| *H01M 8/10* | (2016.01) | |
| *C08F 214/26* | (2006.01) | |
| *C08J 5/22* | (2006.01) | |
| *H01M 4/90* | (2006.01) | |
| *H01M 8/1004* | (2016.01) | |
| *H01M 8/1023* | (2016.01) | |
| *H01M 8/1039* | (2016.01) | |
| *H01M 8/1018* | (2016.01) | |

(52) U.S. Cl.
CPC ........... *C08J 5/225* (2013.01); *H01M 4/8668* (2013.01); *H01M 4/8825* (2013.01); *H01M 4/8828* (2013.01); *H01M 4/9008* (2013.01); *H01M 8/1004* (2013.01); *H01M 8/1023* (2013.01); *H01M 8/1039* (2013.01); *C08J 2327/24* (2013.01); *H01M 2008/1095* (2013.01); *H01M 2300/0082* (2013.01); *Y02P 70/56* (2015.11)

(58) Field of Classification Search
CPC ............. H01M 4/8825; H01M 8/1004; H01M 8/1018; H01M 8/1023; H01M 8/1039; C08F 16/24; C08F 8/00; C08F 214/262; C08J 3/03; C08J 3/05; C08J 8/00; C08J 5/225; C08J 2327/24
USPC ............................................................ 521/25
See application file for complete search history.

(56) References Cited

U.S. PATENT DOCUMENTS

| | | | |
|---|---|---|---|
| 2006/0287497 A1* | 12/2006 | Tayanagi | ................. C08J 5/225 |
| | | | 528/391 |
| 2009/0215938 A1 | 8/2009 | Tayanagi et al. | |
| 2009/0221726 A1* | 9/2009 | Higuchi | .................... C08F 2/22 |
| | | | 521/30 |
| 2015/0148482 A1* | 5/2015 | Yoshimura | ............... C08F 14/18 |
| | | | 524/805 |

FOREIGN PATENT DOCUMENTS

| | | |
|---|---|---|
| JP | 2010-18674 | 1/2010 |
| JP | 2013-181128 | 9/2013 |
| WO | WO 2004/066426 A1 | 8/2004 |
| WO | WO 2008/062653 A1 | 5/2008 |
| WO | WO 2013/115072 A1 | 8/2013 |
| WO | WO 2013/176185 A1 | 11/2013 |

\* cited by examiner

PROCESS FOR PRODUCING LIQUID COMPOSITION AND PROCESS FOR PRODUCING CATALYST LAYER-FORMING COATING LIQUID

This application is a continuation of PCT Application No. PCT/JP2016/075350, filed on Aug. 30, 2016, which is based upon and claims the benefit of priority from Japanese Patent Application No. 2015-171321 filed on Aug. 31, 2015. The contents of those applications are incorporated herein by reference in their entireties.

TECHNICAL FIELD

The present invention relates to a process for producing a liquid composition, a process for producing a catalyst layer-forming coating liquid, and a method for producing a membrane/electrode assembly.

BACKGROUND ART

A polymer electrolyte fuel cell is, for example, a stack of a plurality of cells, each comprising a membrane/electrode assembly sandwiched between two separators. The membrane/electrode assembly comprises an anode and a cathode each having a catalyst layer, and a polymer electrolyte membrane disposed between the anode and the cathode.

The polymer electrolyte membrane in the membrane/electrode assembly is formed, for example, by applying and drying a liquid composition containing a polymer having ion exchange groups and a liquid medium. Further, the catalyst layer in the membrane/electrode assembly is formed, for example, by applying and drying a catalyst layer-forming coating liquid obtained by mixing the liquid composition and a catalyst.

The liquid composition is produced, for example, by a process comprising a step of extruding a fluorinated polymer having —SO$_2$F groups in a melt state into a strand, which is cooled with water and cut by a pelletizer to obtain pellets, a step of converting the —SO$_2$F groups in the fluorinated polymer having —SO$_2$F groups in the pellets into ion exchange groups to obtain pellets of a fluorinated polymer having ion exchange groups, and a step of mixing the pellets of the fluorinated polymer having ion exchange groups and a liquid medium (Patent Document 1).

PRIOR ART DOCUMENTS

Patent Documents

Patent Document 1: WO2013/115072

DISCLOSURE OF INVENTION

Technical Problem

The liquid composition obtained by the process disclosed in Patent Document 1 contains a fluorinated polymer having ion exchange groups with a relatively large particle size. Accordingly, if even foreign matters with a relatively small particle size among foreign matters included in the liquid composition are to be removed in the production process, when the liquid composition is subjected to filtration through a filter, the filter is likely to be clogged. Even foreign matters with a relatively small particle size cause problems if included in the catalyst layer. Further, when a polymer electrolyte membrane is made thin, inclusion of foreign matters in the polymer electrolyte membrane is highly likely to cause problems.

The present invention provides a process for producing a liquid composition in which formation of a fluorinated polymer having ion exchange groups with a relatively large particle size is suppressed; a process for producing a catalyst layer-forming coating liquid capable of forming a catalyst layer in which inclusion of foreign matters is suppressed; and a method for producing a membrane/electrode assembly by which a catalyst layer or a polymer electrolyte membrane in which inclusion of foreign matters is suppressed, can be formed.

Solution To Problem

The present invention provides the following embodiments.

[1] A process for producing a liquid composition, which comprises
holding a fluorinated polymer having —SO$_2$F groups at from 140 to 160° C. for at least 45 minutes,
cooling it to less than 110° C. at a rate of at least 50° C./min,
converting the —SO$_2$F groups in the fluorinated polymer to ion exchange groups to obtain a fluorinated polymer having ion exchange groups, and
mixing the fluorinated polymer having ion exchange groups and a liquid medium.

[2] A process for producing a liquid composition, which comprises cooling a fluorinated polymer having —SO$_2$F groups in a melt state to from 140 to 160° C. and holding it at from 140 to 160° C. for at least 10 minutes,
cooling it to less than 110° C. at a rate of at least 50° C./min,
converting the —SO$_2$F groups in the fluorinated polymer to ion exchange groups to obtain a fluorinated polymer having ion exchange groups, and
mixing the fluorinated polymer having ion exchange groups and a liquid medium.

[3] The process for producing a liquid composition according to [1] or [2], wherein the fluorinated polymer having —SO$_2$F groups has either one or both of structural units represented by the following formula (u1) and structural units represented by the following formula (u2), and structural units derived from tetrafluoroethylene:

wherein $Q^1$ is a single bond or a perfluoroalkylene group which may have an etheric oxygen atom, $Y^1$ is a fluorine atom or a monovalent perfluoroorganic group, s is 0 or 1; $Q^{21}$ is a pefluoroalkylene group which may have an etheric oxygen atom, $Q^{22}$ is a single bond or a perfluoroalkylene group which may have an etheric oxygen atom, $Y^2$ is a fluorine atom or a monovalent perfluoroorganic group, and t is 0 or 1.

[4] The process for producing a liquid composition according to [3], wherein the fluorinated polymer having ion exchange groups has an ion exchange capacity of from 0.5 to 1.8 meq/g dry resin when it has structural units represented by the formula (u1) and has no structural units represented by the formula (u2), or from 0.5 to 2.8 meq/g dry resin when it has structural units represented by the formula (u2).

[5] The process for producing a liquid composition according to any one of [1] to [4], wherein the TQ value of the fluorinated polymer having —$SO_2F$ groups is from 150 to 350° C.

[6] A process for producing a catalyst layer-forming coating liquid, which comprises preparing a liquid composition by the process for producing a liquid composition as defined in any one of [1] to [5], subjecting the liquid composition to filtration through a filter, and mixing the liquid composition subjected to filtration through a filter and a catalyst to prepare a catalyst layer-forming coating liquid.

[7] A method for producing a membrane/electrode assembly for a polymer electrolyte fuel cell comprising an anode having a catalyst layer, a cathode having a catalyst layer and a polymer electrolyte membrane disposed between the anode and the cathode, which comprises preparing a catalyst layer-forming coating liquid by the process for producing a catalyst layer-forming coating liquid as defined in [6], and forming the catalyst layer of either one or both of the cathode and the anode by using the coating liquid.

[8] A method for producing a membrane/electrode assembly for a polymer electrolyte fuel cell comprising an anode having a catalyst layer, a cathode having a catalyst layer and a polymer electrolyte membrane disposed between the anode and the cathode, which comprises preparing a liquid composition by the process for producing a liquid composition as defined in any one of [1] to [5], and forming the polymer electrolyte membrane by using the liquid composition.

Advantageous Effects of Invention

According to the process for producing a liquid composition of the present invention, it is possible to produce a liquid composition in which formation of a fluorinated polymer having ion exchange groups with a relatively large particle size is suppressed. According to the process for producing a catalyst layer-forming coating liquid of the present invention, it is possible to produce a catalyst layer-forming coating liquid capable of forming a catalyst layer in which inclusion of foreign matters is suppressed. According to the method for producing a membrane/electrode assembly of the present invention, it is possible to produce a catalyst layer or a polymer electrolyte membrane in which inclusion of foreign matters is suppressed.

DESCRIPTION OF EMBODIMENTS

Figure 1:
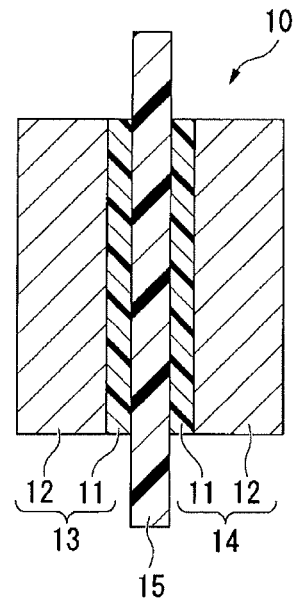
FIG. 1 is a schematic sectional view illustrating an example of a membrane/electrode assembly.

In this specification, structural units represented by formula (u1) will be referred to as units (u1). A compound represented by the formula (m1) will be referred to as a compound (m1). Structural units and compounds represented by other formulae will be referred to in the same manner.

The following definitions of terms are applicable throughout description and claims.

A "structural unit" means a unit derived from a monomer, formed by polymerization of the monomer. The structural unit may be a unit directly formed by the polymerization reaction and a unit having part of such a unit converted to another structure by treating the polymer.

An "ion exchange group" means a group in which one or more cations are capable of being converted to other cations, and is a group having $H^+$, a monovalent metal cation, an ammonium ion or the like. The ion exchange group may, for example, be a sulfonic acid group, a sulfonimide group or a sulfonmethide group.

A "sulfonic acid group" includes —$SO_3^-H^+$ and —$SO_3^-M^+$ (wherein $M^+$ is a monovalent metal ion, or an ammonium ion wherein one or more hydrogen atoms may be substituted by a hydrocarbon group).

The "melt state" means a state such that the heated polymer is softened and shows fluidity. Specifically, it is a state where the polymer is heated to a temperature of at least TQ value of the polymer −50° C.

The "TQ value" is an index of a molecular weight and a softening temperature of a polymer, and is a temperature at which the extrusion rate becomes 100 $mm^3$/sec when the polymer is melt-extruded by using a nozzle having a length of 1 mm and an inner diameter of 1 mm under an extrusion pressure of 2.94 MPa.

<Liquid Composition>

The liquid composition obtainable by the production process of the present invention comprises the after-described fluorinated polymer having ion exchange groups (hereinafter sometimes referred to as a fluorinated polymer (H)) and a liquid medium, and has the fluorinated polymer (H) dispersed in the liquid medium. The liquid composition may contain a component other than the fluorinated polymer (H) and the liquid medium as the case requires within a range not to impair the effects of the present invention.

The fluorinated polymer (H) is one obtained by converting —$SO_2F$ groups in the fluorinated polymer having —$SO_2F$ groups (hereinafter sometimes referred to as a fluorinated polymer (F)) to ion exchange groups.

The ion exchange groups converted from the —$SO_2F$ groups may, for example, be sulfonic acid groups, sulfonimide groups or sulfonmethide groups.

The ion exchange groups are classified into an acid form wherein the cation is $H^+$ and the salt form wherein the cation is a metal ion, an ammonium ion or the like. For a catalyst layer or a polymer electrolyte membrane of a membrane/electrode assembly for a polymer electrolyte fuel cell (hereinafter sometimes referred to as a membrane/electrode assembly), usually a fluorinated polymer (H) having acid form ion exchange groups is used.

As the fluorinated polymer (H), in view of the durability, preferred is a perfluorocarbon polymer in which all hydrogen atoms bonded to carbon atoms by a covalent bond are substituted by fluorine atoms.

As the fluorinated polymer (H), in order that the effects of the present invention are sufficiently exhibited, preferred is the following fluorinated polymer (H1).

The fluorinated polymer (H1) has either one or both of the following units (u'1) and units (u'2) and structural units derived from tetrafluoroethylene (hereinafter sometimes referred to as TFE) (hereinafter sometimes referred to as TFE units).

Unit (u'1):

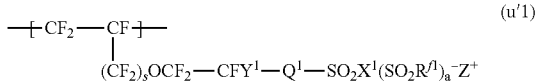

wherein $Q^1$ is a single bond or a perfluoroalkylene group which may have an etheric oxygen atom, $Y^1$ is a fluorine atom or a monovalent perfluoroorganic group, s is 0 or 1, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom and 2 when $X^1$ is a carbon atom, and $Z^+$ is $H^+$, a monovalent metal ion, or an ammonium ion wherein one or more hydrogen atoms may be substituted by a hydrocarbon group. A single bond means that the carbon atom in $CFY^1$ and the sulfur atom in $SO_2$ are directly bonded. An organic group means a group having at least one carbon atom.

The number of etheric oxygen atoms, if any, in the perfluoroalkylene group as $Q^1$ may be one or more. Further, such an oxygen atom may be inserted in a carbon atom/carbon atom bond of the perfluoroalkylene group or may be bonded to a terminal carbon atom.

The perfluoroalkylene group may be linear or branched.

The number of carbon atoms in the perfluoroalkylene group is preferably from 1 to 6, more preferably from 1 to 4. When the number of carbon atoms is at most 6, a decrease of the ion exchange capacity of the fluorinated polymer (H1) can be suppressed, and a decrease of the proton conductivity can be suppressed.

The perfluoroalkyl group as $R^{f1}$ may be linear or branched and is preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

—$SO_2X^1(SO_2R^{f1})_a^-Z^+$ may be —$SO_3^-Z^+$, —$SO_2N(SO_2R^{f1})^-Z^+$ or —$SO_2C(SO_2R^{f1})_2^-Z^+$.

$Y^1$ is preferably a fluorine atom or a trifluoromethyl group.

As the unit (u'1), in view of easy production of the fluorinated polymer (H1) and easy industrial application, the following units (u'1-1) to (u'1-4) are preferred.

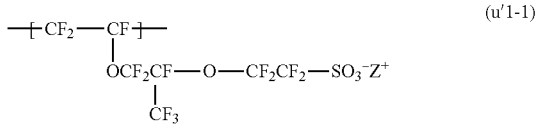

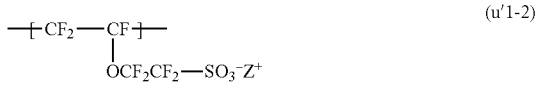

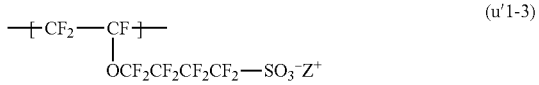

Unit (u'2):

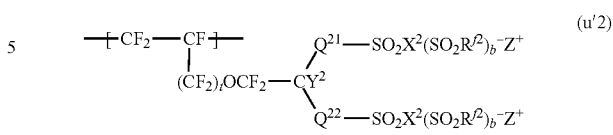

wherein $Q^{21}$ is a perfluoroalkylene group which may have an etheric oxygen atom, $Q^{22}$ is a single bond or a perfluoroalkylene group which may have an etheric oxygen atom, $Y^2$ is a fluorine atom or a monovalent perfluoroorganic group, t is 0 or 1, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom and 2 when $X^2$ is a carbon atom, and $Z^+$ is $H^+$, a monovalent metal ion, or an ammonium ion wherein one or more hydrogen atoms may be substituted by a hydrocarbon group. In a case where $Q^{21}$ is a single bond, the carbon atom in $CY^2$ and the sulfur atom in $SO_2$ are directly bonded. An organic group means a group containing at least one carbon atom.

The number of etheric oxygen atoms, if any, in the perfluoroalkylene group as $Q^{21}$ and $Q^{22}$ may be one or more. Further, such an oxygen atom may be inserted in a carbon atom/carbon atom bond of the perfluoroalkylene group or may be added to a terminal carbon atom.

The perfluoroalkylene group may be linear or branched and is preferably linear.

The number of carbon atoms in the perfluoroalkylene group is preferably from 1 to 6, more preferably from 1 to 4. When the number of carbon atoms is at most 6, the boiling point of the raw material fluorinated monomer is low, and purification by distillation will easily be carried out. Further, when the number of carbon atoms is at most 6, a decrease of the ion exchange capacity of the fluorinated polymer (H1) can be suppressed, and a decrease of the proton conductivity can be suppressed.

$Q^{22}$ is preferably a $C_{1-6}$ perfluoroalkylene group which may have an etheric oxygen atom. In such a case, excellent stability of the power generation performance will be obtained when a polymer electrolyte fuel cell is operated for a long period of time, as compared with a case where $Q^{22}$ is a single bond.

It is preferred that at least one of $Q^{21}$ and $Q^{22}$ is a $C_{1-6}$ perfluoroalkylene group having an etheric oxygen atom. A fluorinated monomer having a $C_{1-6}$ perfluoroalkylene group having an etheric oxygen atom can be prepared without a fluorination reaction with a fluorine gas, and hence can be produced easily in a good yield.

The perfluoroalkyl group as $R^{f2}$ may be linear or branched and is preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

When the unit (u'2) has at least two $R^{f2}$, the respective $R^{f2}$ may be the same or different from each other.

—$SO_2X^2(SO_2R^{f2})_b^-Z^+$ may be —$SO_3^-Z^+$, —$SO_2N(SO_2R^{f2})^-Z^+$ or —$SO_2C(SO_2R^{f2})_2^-Z^+$.

$Y^2$ is preferably a fluorine atom or a $C_{1-6}$ linear perfluoroalkyl group which may have an etheric oxygen atom.

As the unit (u'2), in view of easy production of the fluorinated polymer (H1) and easy industrial application, units (u'2-1) to (u'2-3) are preferred.

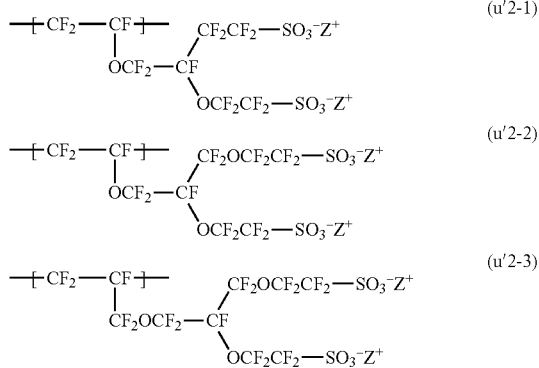

The TFE unit imparts mechanical strength and chemical durability to the fluorinated polymer (H1).

The fluorinated polymer (H1) may further have structural units derived from other monomer described hereinafter (hereinafter sometimes referred to as other units) within a range not to impair the effects of the present invention.

The fluorinated polymer (H1) may have one type of each of the units (u'1), the units (u'2) and other units, or may have two or more types of each of the units.

The proportions of the respective structural units may be properly adjusted so that the ion exchange capacity of the fluorinated polymer (H1) is within the preferred range.

The fluorinated polymer (H1) has an ion exchange capacity of preferably from 0.5 to 1.8 meq/g dry resin, more preferably from 0.9 to 1.5 meq/g dry resin when it has units (u'1) and has no units (u'2). When the ion exchange capacity is at least the lower limit value of the above range, the proton conductivity will be high, and a sufficient cell output will be obtained. When the ion exchange capacity is at most the upper limit value of the above range, a polymer having a high molecular weight will easily be prepared, and the fluorinated polymer (H1) will not swell excessively with water, and mechanical strength can thereby be held.

The fluorinated polymer (H1) has an ion exchange capacity of preferably from 0.5 to 2.8 meq/g dry resin, more preferably from 0.9 to 2.2 meq/g dry resin when it has units (u'2). When the ion exchange capacity is at least the lower limit value of the above range, the proton conductivity tends to be high, and a sufficient cell output will be obtained. When the ion exchange capacity is at most the upper limit value of the above range, it is easy to prepare a polymer having a high molecular weight, and the fluorinated polymer (H1) will not swell excessively with water, and the mechanical strength can thereby be held.

The liquid medium may be a mixed solvent of an organic solvent having a hydroxy group and water.

The organic solvent having a hydroxy group may, for example, be methanol, ethanol, 1-propanol, 2-propanol, 1-butanol, 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol.

The organic solvent having a hydroxy group may be used alone or in combination of two or more.

The proportion of water is preferably from 10 to 99 mass %, more preferably from 40 to 99 mass % based on the mixed solvent (100 mass %). By increasing the proportion of water, dispersibility of the fluorinated polymer (H) in the mixed solvent can be improved.

The proportion of the organic solvent having a hydroxy group is preferably from 1 to 90 mass %, more preferably from 1 to 60 mass % based on the mixed solvent (100 mass %).

The proportion of the fluorinated polymer (H) is preferably from 1 to 50 mass %, more preferably from 3 to 30 mass % based on the liquid composition (100 mass %).

<Process for Producing Liquid Composition>

The process for producing a liquid composition of the present invention comprises a step of heat-treating a fluorinated polymer (F) having —$SO_2F$ groups; a step of converting the —$SO_2F$ groups in the fluorinated polymer (F) to ion exchange groups to obtain a fluorinated polymer (H); and a step of mixing the fluorinated polymer (H) and a liquid medium to prepare a liquid composition.

As the process for producing a liquid composition of the present invention, specifically, the following process (α) and process (β) may be mentioned.

The process (α) is a process for producing a liquid composition, which comprises holding the fluorinated polymer (F) having —$SO_2F$ groups at from 140 to 160° C. for at least 45 minutes, cooling the fluorinated polymer (F) having —$SO_2F$ groups held at from 140 to 160° C. to less than 110° C. at a rate of at least 50° C./min, converting the —$SO_2F$ groups in the fluorinated polymer (F) having —$SO_2F$ groups cooled to less than 110° C. to ion exchange groups thereby to obtain a fluorinated polymer (H) having ion exchange groups, and mixing the fluorinated polymer (H) having ion exchange groups and a liquid medium.

The process (β) is a process for producing a liquid composition, which comprises cooling the fluorinated polymer (F) having —$SO_2F$ groups in a melt state to from 140 to 160° C., holding the fluorinated polymer (F) having —$SO_2F$ groups cooled to from 140 to 160° C., at from 140 to 160° C. for at least 10 minutes, cooling the fluorinated polymer (F) having —$SO_2F$ groups held at from 140 to 160° C. to less than 110° C. at a cooling rate of at least 50° C./min, converting the —$SO_2F$ groups in the fluorinated polymer (F) having —$SO_2F$ groups cooled to less than 110° C. to ion exchange groups thereby to obtain a fluorinated polymer (H) having ion exchange groups, and mixing the fluorinated polymer (H) having ion exchange groups and a liquid medium.

The fluorinated polymer (F) is a precursor of the fluorinated polymer (H). The fluorinated polymer (F) is preferably a perfluorocarbon polymer in which all the hydrogen atoms bonded to carbon atoms by a covalent bond are substituted by fluorine atoms, with a view to obtaining a highly durable fluorinated polymer (H).

As the fluorinated polymer (F), from such a viewpoint that the effects of the present invention will sufficiently be exhibited, the following fluorinated polymer (F1) is preferred.

The fluorinated polymer (F1) has either one or both of the units (u1) and the units (u2), and TFE units.

Unit (u1):

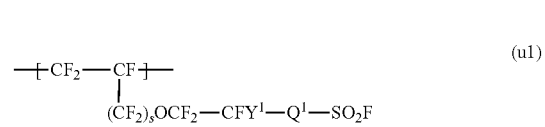

$Q^1$, $Y^1$ and s are as defined as $Q^1$, $Y^1$ and s in the unit (u'1), and the preferred embodiments are also the same.

As the unit (u1), in view of easy production of the fluorinated polymer (F1) and easy industrial application, units (u1-1) to (u1-4) are preferred.

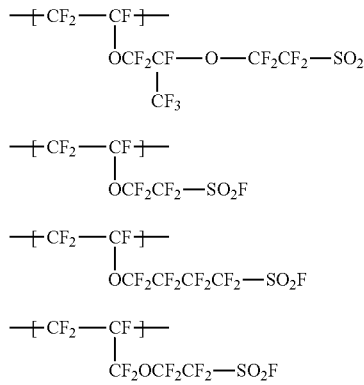

Unit (u2):

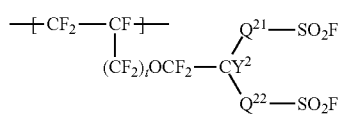

$Q^{21}$ $Q^{22}$ $Y^2$ and t are as defined as $Q^{21}$, $Q^{22}$, $Y^2$ and t in the unit (u'2), and the preferred embodiments are also the same.

As the unit (u2), in view of easy production of the fluorinated polymer (F1) and easy industrial application, the following units (u2-1) to (u2-3) are preferred.

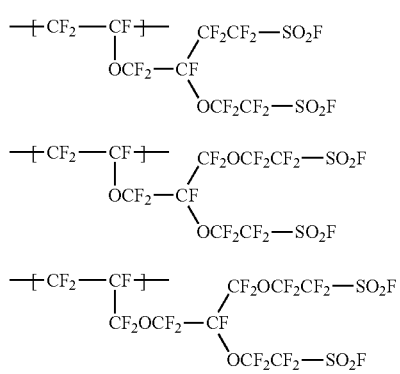

The TFE unit imparts mechanical strength and chemical durability to the fluorinated polymer (F1).

The fluorinated polymer (F1) may further have other units derived from other monomer described hereinafter within a range not to impair the effects of the present invention.

The fluorinated polymer (F1) may have one type of each of the units (u1), the units (u2) and other units, or may have two or more types of each of the units.

The proportions of the respective structural units are properly adjusted so that the ion exchange capacity of the fluorinated polymer (H1) is within a preferred range.

The fluorinated polymer (F1) can be obtained by polymerizing either one or both of compound (m1) and compound (m2), and TFE and as the case requires, other monomer.

Compound (m1):

$$CF_2=CF(CF_2)_sOCF_2-CFY^1-Q^1-SO_2F \quad (m1)$$

$Q^1$, $Y^1$ and s are as defined as $Q^1$, $Y^1$ and s in the unit (u1), and the preferred embodiments are also the same.

As the compound (m1), compounds (m1-1) to (m1-4) are preferred.

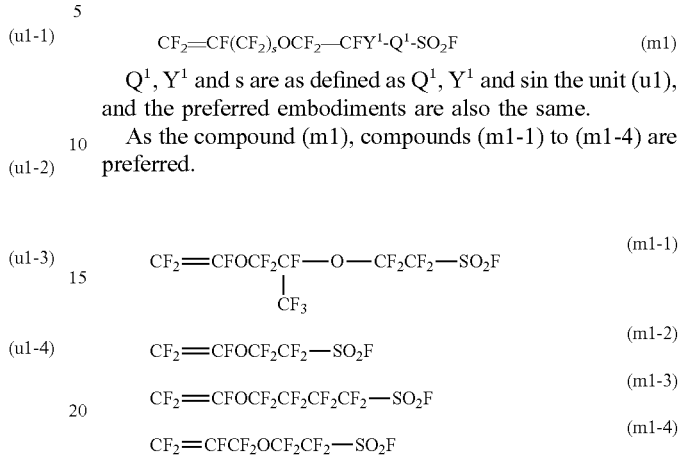

The compound (m1) may be produced, for example, by a known preparation method such as the method disclosed in D. J. Vaugham, "Du Pont Inovation", vol. 43, No. 3, 1973, p. 10, or the method disclosed in Examples of U.S. Pat. No. 4,358,412.

Compound (m2):

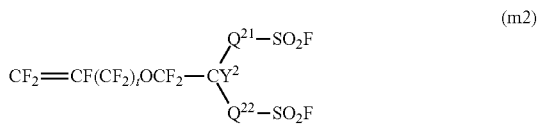

$Q^{21}$ $Q^{22}$ $Y^2$ and t are as defined as $Q^{21}$, $Q^{22}$, $Y^2$ and t in the unit (u2), and preferred embodiments are also the same.

As the compound (m2), compounds (m2-1) to (m2-3) are preferred.

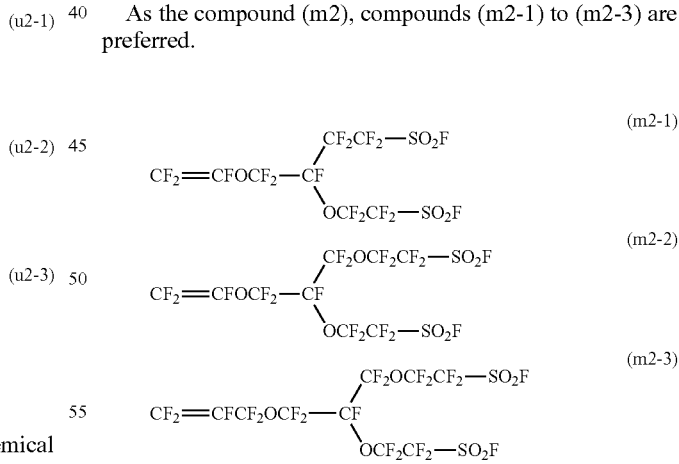

The compound (m2) may be prepared by a known preparation method such as the method disclosed in WO2007/013533.

Other monomer may, for example, be chlorotrifluoroethylene, trifluoroethylene, vinylidene fluoride, vinyl fluoride, ethylene, propylene, a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene), a perfluorovinyl ether (such as a perfluoro(alkyl vinyl ether) or a perfluoro(etheric oxygen atom-containing alkyl vinyl ether)).

The polymerization method may be a known polymerization method such as bulk polymerization, solution polymerization, suspension polymerization or emulsion polymerization. Further, polymerization may be carried out in liquid or supercritical carbon dioxide.

Polymerization is carried out under conditions under which radicals form. To form radicals, a method of applying radiation such ultraviolet rays, γ-rays or electron beams, or a method of adding a radical initiator may, for example, be mentioned.

The obtained fluorinated polymer (F) is recovered as separated from the unreacted monomer, the polymerization medium, etc. The recovered fluorinated polymer (F) may be subjected to the step of heat-treating the fluorinated polymer (F) in the process (α) or the process (β) as described hereinafter as it is. Otherwise, it may be pelletized, or the pellets are pulverized to form a powder, which is then subjected to the step of heat-treating the fluorinated polymer (F) in the process (α) or the process (β) described hereinafter.

The TQ value of the fluorinated polymer (F) is preferably from 150 to 350° C., more preferably from 200 to 320° C. When the TQ value is at least the lower limit value of the above range, a catalyst layer having favorable durability can be formed. When the TQ value is at most the upper limit value of the above range, a liquid composition will easily be prepared.

(Heat Treatment Process (α))

In the heat treatment of the fluorinated polymer (F) in the present invention, it is preferred that after the fluorinated polymer (F) is held in a temperature region of from 140 to 160° C., the fluorinated polymer (F) is rapidly cooled in a temperature region of from 110 to 130° C. so that it does not stay in the region as far as possible.

In the present invention, in order to bring the fluorinated polymer (F) to be in a temperature region of from 140 to 160° C., usually it is heated, and as a heating means, a known means such as a circulating hot air oven, a vacuum oven, an electric furnace, an infrared heating furnace or a peltier plate may, for example, be employed.

In the process (α), the time over which the fluorinated polymer (F) is held at from 140 to 160° C. is at least 45 minutes, preferably from 45 to 240 minutes, more preferably from 50 to 120 minutes. When the holding time is at least the lower limit value of the above range, formation of a fluorinated polymer (H) with a relatively large particle size is suppressed when the liquid composition is prepared. When the holding time is at most the upper limit value of the above range, the heat treatment time can be shortened, thus leading to a high productivity.

When the fluorinated polymer (F) held at from 140 to 160° C. for a predetermined time is cooled to less than 110° C., the cooling rate is at least 50° C./min, preferably from 50 to 1,000° C./m in, more preferably from 50 to 500° C./min. When the cooling rate is at least the lower limit value of the above range, formation of a fluorinated polymer (H) with a relatively large particle size is suppressed when the liquid composition is prepared. When the cooling rate is at most the upper limit value of the above range, e.g. a special equipment for rapid cooling is not necessary. The cooling rate here means an average rate when the fluorinated polymer (F) is held at from 140 to 160° C. for a predetermined time and is cooled from the temperature at which it is held to less than 110° C.

In view of the handling efficiency of the fluorinated polymer (F) cooled to less than 110° C., the fluorinated polymer (F) held at from 140 to 160° C. for a predetermined time is preferably cooled to at most 60° C., more preferably at most 40° C. The lower limit temperature for cooling is preferably at least 0° C. in view of handling efficiency, more preferably at least 10° C.

In the present invention, as a means to cool the fluorinated polymer (F), a known means such as air cooling, water cooling, contact with a heat sink, a peltier plate or an oven equipped with a refrigerator may be employed.

To convert the —$SO_2F$ groups to ion exchange groups, the method disclosed in WO2011/013578 may be mentioned. For example, to convert the —$SO_2F$ groups to acid form sulfonic acid groups (—$SO_3^-H^+$ groups), the —$SO_2F$ groups in the fluorinated polymer (F) are brought into contact with a base to be hydrolyzed to form salt form sulfonic acid groups, which are then brought into contact with an acid to be converted into an acid form so as to be converted into acid form sulfonic acid groups.

By mixing and stirring the fluorinated polymer (H) and the liquid medium, a liquid composition having the fluorinated polymer (H) dispersed in the liquid medium can be prepared.

The liquid composition may be prepared, for example, based on the preparation method disclosed in e.g. JP-A-4-35226, JP-A-2001-504872, JP-A-2005-8279, WO2006/38928 or JP-A-2004-519296.

As a specific method for preparing the liquid composition, a method may be mentioned in which shearing such as stirring is applied to the fluorinated polymer (H) in a liquid medium in the atmospheric pressure or in a state closed in e.g. an autoclave. As the case requires, shearing by e.g. ultrasonic waves may be imparted.

Further, in a case where a mixed liquid obtained by mixing the fluorinated polymer (H) and the liquid medium is formed into the liquid composition by applying shearing such as stirring, shearing such as stirring may be applied to a mixed liquid obtained by adding the liquid medium to the fluorinated polymer (H) all at once, or the liquid medium may be added dividedly to the fluorinated polymer (H) and shearing such as stirring is applied between an interval of addition. For example, shearing such as stirring may be applied to a mixed liquid obtained by adding a part of the organic solvent having a hydroxy group and a part of water to the fluorinated polymer (H), then the rest of the liquid medium is added to the mixture and shearing such as stirring is applied again. Otherwise, only the organic solvent having a hydroxy group is added to the fluorinated polymer (H) and shearing such as stirring is applied, and then only water is added and shearing such as stirring is applied again.

The temperature at the time of preparation of the liquid composition is preferably from 80 to 180° C., more preferably from 100 to 130° C. The preparation time is preferably from 1 to 48 hours, more preferably from 2 to 24 hours.

The shear rate is preferably from 10 to 1,000 $s^{-1}$, more preferably from 50 to 600 $s^{-1}$.

(Heat Treatment Process (β))

In the process (β), the fluorinated polymer (F) is once heated into a melt state. By heating the fluorinated polymer (F) into a melt state once, the time over which the fluorinated polymer (F) is held at from 140 to 160° C. can be shortened. To melt the fluorinated polymer (F), a known means such as a circulating hot air oven, a vacuum oven, an electric furnace, an infrared heating furnace, a peltier plate, an extruder or a kneading apparatus may be used. The melding temperature is preferably from 180 to 300° C., more preferably from 200 to 300° C., with a view to sufficiently improving mobility of the fluorinated polymer (F) and suppressing thermal decomposition of the polymer. The fluorinated polymer (F) is suitably held in such a melt state preferably for from 5 to 1,000 minutes, more preferably from 10 to 240 minutes, so as to sufficiently relax the fluorinated polymer (F) and not to impair the productivity. The fluorinated polymer (F) in a melt state is cooled to from 140 to 160° C. in the present invention, this cooling will be referred to as first cooling, the rate will be referred to as a first cooling rate. This first cooling rate is preferably from 1 to 50° C./min, more preferably from 5 to 50° C./min.

The fluorinated polymer (F) cooled to 140 to 160° C. is held at from 140 to 160° C. in the same manner as in the process (α). The time over which the fluorinated polymer (F) is held at from 140 to 160° C. is at least 10 minutes, preferably from 10 to 100 minutes, more preferably from 10 to 80 minutes. When the holding time is at least the lower limit value of the above range, formation of a fluorinated polymer (H) with a relatively large particle size is suppressed when the liquid composition is prepared. When the holding time is at most the upper limit value of the above range, the heat treatment time can be shortened.

The fluorinated polymer (F) is then cooled to less than 110° C. In the present invention, this cooling will be referred to as second cooling, and the cooling rate and the cooling method are the same as those in the process (α) and the preferred embodiments are also the same. The preferred embodiment of the temperature for cooling the fluorinated polymer (F) is also the same as in the process (α).

The method for converting —SO$_2$F groups in the fluorinated polymer (F) to ion exchange groups to obtain the fluorinated polymer (H), and the method of mixing the fluorinated polymer (H) and the liquid medium to prepare the liquid composition, are the same as those in the process (α) and the preferred embodiments are also the same.

In the above-described process for producing a liquid composition of the present invention, the fluorinated polymer (F) is held at from 140 to 160° C. for at least a predetermined time and then cooled to less than 110° C. at a rate of at least 50° C./min. Accordingly, when the fluorinated polymer (H) obtained by converting the —SO$_2$F groups in the fluorinated polymer (F) to ion exchange groups, is dispersed in the liquid medium, formation of a fluorinated polymer with a relatively large particle size is suppressed. As a result, when the resulting liquid composition is subjected to filtration through a filter, the filter is less likely to be clogged, and foreign matters included in the liquid composition are likely to be removed.

<Catalyst Layer-forming Coating Liquid>

The catalyst layer-forming coating liquid obtainable by the production process of the present invention comprises the fluorinated polymer (H), a catalyst and a liquid medium, and has the fluorinated polymer (H) and the catalyst dispersed in the liquid medium. The catalyst layer-forming coating liquid may contain, as the case requires, within a range not to impair the effects of the present invention, a component other than the fluorinated polymer (H), the catalyst and the liquid medium.

The catalyst may be a supported catalyst having platinum or a platinum alloy supported on a carbon carrier.

The carbon carrier may be carbon black powder.

The liquid medium in the catalyst layer-forming coating liquid is a mixture of the liquid medium contained in the liquid composition and a liquid medium contained in a dispersion of the catalyst described hereinafter.

The solid content concentration in the catalyst layer-forming coating liquid may be properly adjusted so that the viscosity of the catalyst layer-forming coating liquid is suitable for application.

The mass ratio of the fluorinated polymer (H) and the catalyst in the catalyst layer-forming coating liquid may be properly adjusted depending upon e.g. the performance required for the catalyst layer.

<Process for Producing Catalyst Layer-forming Coating Liquid>

The process for producing a catalyst layer-forming coating liquid of the present invention comprises, after the steps in the above-described process (α) or (β), a step of subjecting the liquid composition to filtration through a filter and then a step of mixing the liquid composition and the catalyst to prepare a catalyst layer-forming coating liquid.

In the step of subjecting the liquid composition to filtration through a filter, foreign matters in the liquid composition are removed.

The pore size of the filter is preferably from 0.1 to 10 μm, more preferably from 0.1 to 5 μm, further preferably from 0.2 to 0.5 μm. When the pore size of the filter is at most the upper limit value, small foreign matters can be removed when the liquid composition is subjected to filtration. When the pore size of the filter is at least the lower limit value, a high pressure will not be required when the liquid composition is subjected to filtration.

The catalyst layer-forming coating liquid may be prepared, for example, by mixing the liquid composition in the present invention and a dispersion of the catalyst, followed by stirring. The catalyst layer-forming coating liquid may contain, as the case requires, within a range not to impair the effects of the present invention, a component other than the fluorinated polymer (H), the catalyst and the liquid medium.

The dispersion of the catalyst is obtained by dispersing the catalyst in a liquid medium.

The liquid medium contained in the dispersion of the catalyst may, for example, be water or an organic solvent and is preferably a mixed solvent containing water and a hydrocarbon-based alcohol.

To prepare the catalyst layer-forming coating liquid, a known method may be mentioned. Specifically, a method of utilizing high speed rotation e.g. by a stirring machine such as a homogenizer or a homomixer, a high-speed rotating jet stream or a grinder; a method of imparting shearing force to the coating liquid by extruding the coating liquid from a narrow portion while applying a high pressure e.g. by a high pressure emulsification apparatus; a method of dispersing the dispersoid in the liquid medium by applying high energy such as ultrasonic waves; or a method of dispersing the dispersoid in the liquid medium by collision of beads e.g. by a bead mill, may, for example, be mentioned.

The temperature of the coating liquid at the time of preparation is preferably from 5 to 50° C., more preferably from 10 to 30° C.

In the above-described process for producing a catalyst layer-forming coating liquid of the present invention, since a liquid composition in which formation of a fluorinated polymer (H) with a relatively large particle size is suppressed is used, when the liquid composition is subjected to filtration through a filter, the filter is less likely to be clogged, and foreign matters included in the liquid composition are likely to be removed. As a result, a catalyst layer-forming coating liquid in which the amount of foreign matters having a relatively small particle size is suppressed is obtained. Therefore, according to the process for producing a catalyst layer-forming coating liquid of the present invention, it is possible to produce a catalyst layer-forming coating liquid capable of forming a catalyst layer in which inclusion of foreign matters having a relatively small particle size is suppressed.

<Membrane/Electrode Assembly>

FIG. 1 is a schematic sectional view illustrating an example of a membrane/electrode assembly. The membrane/electrode assembly 10 comprises an anode 3 having a catalyst layer 11 and a gas diffusion layer 12, a cathode 14 having a catalyst layer 11 and a gas diffusion layer 12, and a polymer electrolyte membrane 15 disposed between the anode 13 and the cathode 14 in contact with the catalyst layers 11.

The catalyst layer is a layer containing a catalyst and a polymer having ion exchange groups.

The polymer having ion exchange groups is preferably the fluorinated polymer (H) in view of excellent chemical durability, more preferably a perfluoropolymer having ion exchange groups, further preferably the fluorinated polymer (H1).

The gas diffusion layer has a function to uniformly diffuse gas through the catalyst layer and a function as a current collector. The gas diffusion layer may, for example, be carbon paper, carbon cloth or carbon felt. The gas diffusion layer is preferably made water repellent by treatment with e.g. polytetrafluoroethylene.

Figure 2:
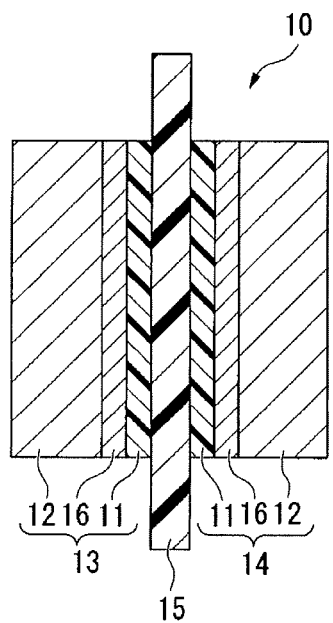
FIG. 2 is a schematic sectional view illustrating another example of a membrane/electrode assembly.

The membrane/electrode assembly 10 may have a carbon layer 16 between the catalyst layer 11 and the gas diffusion layer 12, as shown in FIG. 2.

By disposing the carbon layer, it is possible to improve the gas diffusion property on the surface of the catalyst layer and to substantially improve the power generation performance of the polymer electrolyte fuel cell.

The carbon layer is a layer containing carbon and a nonionic fluorinated polymer.

The carbon may, for example, be carbon particles or carbon fibers and is preferably carbon nanofibers having a fiber diameter of from 1 to 1,000 nm and a fiber length of at most 1,000 μm.

The nonionic fluorinated polymer may, for example, be polytetrafluoroethylene.

The polymer electrolyte membrane is a membrane containing a polymer having ion exchange groups.

The polymer having ion exchange groups may be the fluorinated polymer (H), and is preferably a perfluoropolymer having ion exchange groups, more preferably the fluorinated polymer (H1).

The polymer electrolyte membrane may be reinforced by a reinforcing material. The reinforcing material may, for example, be a porous body, fibers, woven fabric or nonwoven fabric. The material for the reinforcing material may, for example, be polytetrafluoroethylene, a tetrafluoroethylene/hexafluoropropylene copolymer, a tetrafluoroethylene/perfluoro(alkyl vinyl ether) copolymer, polyethylene, polypropylene or polyphenylene sulfide.

The polymer electrolyte membrane may further contain at least one type of atoms selected from the group consisting of cerium and manganese in order to further improve the durability. Cerium and manganese will decompose hydrogen peroxide which is a substance to cause deterioration of the polymer electrolyte membrane. Such cerium or manganese is preferably present in the form of ions in the polymer electrolyte membrane, and so long as it is present in the form of ions, it may be present in any state in the polymer electrolyte membrane.

<Method for Producing Membrane/Electrode Assembly>

When the membrane/electrode assembly has no carbon layer, the membrane/electrode assembly is produced, for example, by the following methods.

a method which comprises forming catalyst layers on a polymer electrolyte membrane to form a membrane/catalyst layer assembly, and sandwiching the membrane/catalyst layer assembly between gas diffusion layers.

a method which comprises forming catalyst layers on gas diffusion layers to form electrodes (an anode and a cathode) and sandwiching a polymer electrolyte membrane between the electrodes.

When the membrane/electrode assembly has a carbon layer, the membrane/electrode assembly is produced, for example, by the following methods.

a method which comprises applying a dispersion containing carbon and a nonionic fluorinated polymer onto substrate films, followed by drying to form carbon layers, forming catalyst layers on the carbon layers, then bonding the catalyst layers and a polymer electrolyte membrane, followed by peeling off the substrate films to obtain a membrane/catalyst layer assembly having carbon layers, and sandwiching the membrane/catalyst layer assembly between gas diffusion layers.

a method which comprises applying a dispersion containing carbon and a nonionic fluorinated polymer onto gas diffusion layers, followed by drying to form carbon layers, and sandwiching a membrane/catalyst layer assembly having catalyst layers formed on a polymer electrolyte membrane, between the gas diffusion layers having carbon layers.

(Method for Producing Membrane/Electrode Assembly According to First Embodiment)

The method for producing a membrane/electrode assembly of the present invention according to a first embodiment comprises, after the above-described step of preparing the catalyst layer-forming coating liquid, a step of forming a catalyst layer of either one or both of the cathode and the anode by using the catalyst layer-forming coating liquid.

The catalyst layers may be formed, for example, by the following methods.

a method which comprises applying the catalyst layer-forming coating liquid onto a polymer electrolyte membrane, a gas diffusion layer or a carbon layer, followed by drying.

a method which comprises applying the catalyst layer-forming coating liquid onto a substrate film, followed by drying to form a catalyst layer, and transferring the catalyst layer onto a polymer electrolyte membrane.

(Method for Producing Membrane/Electrode Assembly According to Second Embodiment)

The method for producing a membrane/electrode assembly of the present invention according to a second embodiment comprises, after the steps in the above-described process (α) or (β), a step of subjecting the obtained liquid composition to filtration through a filter as the case requires, and after this step if conducted or after the steps in the process (α) or (β) when the above step is not conducted, a step of forming a polymer electrolyte membrane by using the obtained liquid composition.

In a case where the step of subjecting the liquid composition to filtration through a filter is conducted, this step may be carried out in the same manner as in the above first embodiment, and the preferred embodiments are also the same.

The polymer electrolyte membrane may be formed, for example, by a method (casting method) of applying the liquid composition onto a substrate film or a catalyst layer, followed by drying.

It is preferred to carry out annealing to stabilized the polymer electrolyte membrane. The annealing temperature is preferably from 130 to 200° C. When the annealing temperature is at least 130° C., the fluorinated polymer (H) does not hydrate excessively. When the annealing temperature is at most 200° C., thermal decomposition of the ion exchange groups can be suppressed.

According to the above-described method for producing a membrane/electrode assembly of the present invention, which uses the liquid composition of the present invention for formation of the catalyst layer or the polymer electrolyte membrane, it is possible to form a catalyst layer and a polymer electrolyte membrane in which inclusion of foreign matters is suppressed.

<Polymer Electrolyte Fuel Cell>

By disposing a separator having grooves formed as gas flow paths, on both sides of the membrane/electrode assembly, a polymer electrolyte fuel cell is obtained.

The separator may be a separator made of various conductive material, such as a metal separator, a carbon separator, or a separator made of a mixture of graphite and a resin.

In the polymer electrolyte fuel cell, power generation is carried out by supplying a gas containing oxygen to the cathode, and a gas containing hydrogen to the anode. Further, the membrane/electrode assembly can be applied also to a methanol fuel cell for generating electric power by supplying methanol to the anode.

EXAMPLES

Now, the present invention will be described in further detail with reference to Examples, but the present invention is by no means limited by these Examples. Ex. 1 to 11 are Examples of the present invention, and Ex. 12 to 23 are Comparative Examples.

(TQ Value)

The TQ value (unit: ° C.) is an index of a molecular weight and a softening temperature of the fluorinated polymer (F). Using Flow Tester (manufactured by SHIMADZU CORPORATION, CFT-500D), the extrusion rate of the fluorinated polymer (F) was measured by using a nozzle having a length of 1 mm and an inner diameter of 1 mm under an extrusion pressure of 2.94 MPa, and the temperature at which the extrusion rate became 100 mm³/sec was taken as the TQ value.

(Clogging of Filter)

The liquid composition before filtration through a filter was subjected to filtration through a filter having a pore size of 0.5 μm or 0.2 μm, and evaluation was made based on the following standards.

⊚ (excellent): Filtration of the liquid composition was possible by applying a pressure of less than 0.1 MPa.

○ (good): Filtration of the liquid composition was possible by applying a pressure of at least 0.1 MPa.

x(bad): The filter was clogged and filtration of the liquid composition was not possible.

(Fluorinated Polymer (F))

The proportions of the respective structural units of the following fluorinated polymer (F) were obtained by ¹⁹F-NMR. Further, the ion exchange capacity of the fluorinated polymer (H) after hydrolysis of the fluorinated polymer (F) was calculated from the proportions of the respective structural units obtained by ¹⁹F-NMR.

Fluorinated Polymer (F1-1):

The proportion of the structural units of compound (m1-1) and TFE was such that compound (m1-1)/TFE=18/82 (molar ratio), and the TQ value was 220° C. The ion exchange capacity of the fluorinated polymer (H) was 1.1 meq/g dry resin.

Fluorinated Polymer (F1-2):

The proportion of the structural units of compound (m1-1) and TFE was such that compound (m1-1)/TFE=23/77 (molar ratio), and the TQ value was 232° C. The ion exchange capacity of the fluorinated polymer (H) was 1.26 meq/g dry resin.

Fluorinated Polymer (F2-1):

The proportion of the structural units of compound (m1-1), compound (m2-2) and TFE was such that compound (m1-1)/compound (m2-2)/TFE=8/9/83 (molar ratio), and the TQ value was 245° C. The ion exchange capacity of the fluorinated polymer (H) was 1.52 meq/g dry resin.

Fluorinated Polymer (F2-2):

The proportion of the structural units of compound (m2-2) and TFE was such that compound (m2-2)/TFE=20/80 (molar ratio), and the TQ value was 240° C. The ion exchange capacity of the fluorinated polymer (H) was 1.95 meq/g dry resin.

$$CF_2=CFOCF_2CF(CF_3)-O-CF_2CF_2-SO_2F \quad (m1-1)$$

$$CF_2=CFOCF_2-CF\begin{smallmatrix}CF_2OCF_2CF_2-SO_2F\\OCF_2CF_2-SO_2F\end{smallmatrix} \quad (m2-2)$$

Ex. 1

Fluorinated polymer (F1-1) was put in an oven at 240° C. and heated into a melt state, and held at 240° C. for 180 minutes. The setting of the oven was changed to cool the fluorinated polymer (F1-1) to 140° C. at a cooling rate of 5° C./min, and the fluorinated polymer (F1-1) was held at 140° C. for 10 minutes.

The fluorinated polymer (F1-1) was taken out from the oven and cooled to 25° C. at a rate of 100° C./min.

The fluorinated polymer (F1-1) was ground and to 100 g of the ground fluorinated polymer (F1-1), 150 g of an aqueous potassium hydroxide solution at a concentration of 48 mass %, 98 g of methanol and 220 g of ultrapure water were added, the temperature was increased until the internal temperature reached 90° C. with stirring, and the mixture was held for 16 hours while the temperature was controlled within ±3° C. Then, a liquid containing potassium hydroxide was discharged, and a salt form fluorinated polymer was obtained.

To the salt form fluorinated polymer, 450 g of 3N sulfuric acid was added, the temperature was increased to 85° C., followed by stirring for 5 hours and then by draining. Then, an operation of adding 450 g of ultrapure water, increasing the temperature to 90° C., followed by stirring for one hour and then by draining, was repeated totally 10 times, and the pH of waste water in the tenth operation being at least 6 was confirmed. By drying while a nitrogen gas was introduced, acid form fluorinated polymer (H1-1) was obtained.

To 22 g of the acid form fluorinated polymer (H1-1), 24 g of ultrapure water was added, followed by stirring. 36 g of ethanol was added with stirring. The temperature was increased so that the internal temperature would be 105° C., followed by stirring at 105° C. for 4 hours and then by cooling.

After cooling, by filtration through a filter, a liquid composition was obtained. The results are shown in Table 1. In the following Ex. also, the results are shown in Table 1.

Ex. 2

Fluorinated polymer (F1-1) was put in an oven at 200° C. and heated into a melt state, and held at 200° C. for 180 minutes.

The setting of the oven was changed to cool the fluorinated polymer (F1-1) to 160° C. at a cooling rate of 250° C./min, and the fluorinated polymer (F1-1) was held at 160° C. for 30 minutes. The setting of the oven was further change to cool the fluorinated polymer (F1-1) to 25° C. at a cooling rate of 50° C./min.

In the same manner as in Ex. 1, acid form fluorinated polymer (H1-1) was obtained, then a liquid composition was obtained. The results are shown in Table 1.

Ex. 3

Fluorinated polymer (F1-1) was put in an oven at 160° C. and held at 160° C. for 60 minutes. The fluorinated polymer (F1-1) was taken out from the oven and cooled to 25° C. at a cooling rate of 100° C./min.

In the same manner as in Ex. 1, acid form fluorinated polymer (H1-1) was obtained, then a liquid composition was obtained.

Ex. 4

Fluorinated polymer (F1-1) was put in an oven at 150° C. and held at 150° C. for 60 minutes. The setting of the oven was changed to cool the fluorinated polymer (F1-1) to 25° C. at a cooling rate of 50° C./min.

In the same manner as in Ex. 1, acid form fluorinated polymer (H1-1) was obtained, and then a liquid composition was obtained.

Ex. 5

Fluorinated polymer (F1-1) was put in an oven at 240° C. and heated into a melt state, and held at 240° C. for 180 minutes. The setting of the oven was changed to cool the fluorinated polymer (F1-1) to 150° C. at a cooling rate of 50° C./min, and the fluorinated polymer (F1-1) was held at 150° C. for 60 minutes.

The fluorinated polymer (F1-1) was taken out from the oven and cooled to 25° C. at a rate of 100° C./min. In the same manner as in Ex. 1, acid form fluorinated polymer (H1-1) was obtained, and then a liquid composition was obtained.

Ex. 6

A liquid composition was obtained in the same manner as in Ex. 1 except that fluorinated polymer (F1-2) was used instead of fluorinated polymer (F1-1).

Ex. 7

A liquid composition was obtained in the same manner as in Ex. 3 except that fluorinated polymer (F1-2) was used instead of fluorinated polymer (F1-1) and that the holding temperature was 140° C. instead of 160° C.

Ex. 8

Fluorinated polymer (F2-1) was put in an oven at 240° C. and heated into a melt state, and held at 240° C. for 180 minutes. The setting of the oven was changed to cool the fluorinated polymer (F2-1) to 150° C. at a cooling rate of 5° C./min, and the fluorinated polymer (F2-1) was held at 150° C. for 30 minutes.

The fluorinated polymer (F2-1) was taken out from the oven and cooled to 25° C. at a cooling rate of 100° C./min.

In the same manner as in Ex. 1 except that the fluorinated polymer (F2-1) was used, acid form fluorinated polymer (H2-1) was obtained.

22 g of the acid form fluorinated polymer (H2-1) was added to a mixed liquid comprising 32 g of ultrapure water and 32 g of ethanol with stirring. The temperature was increased so that the internal temperature would be 120° C., followed by stirring at 120° C. for 6 hours, and 12 g of ultrapure water was injected by pressure with nitrogen, followed by stirring further for 2 hours, and then by cooling. After cooling, filtration through a filter was conducted to obtain a liquid composition.

Ex. 9

Fluorinated polymer (F2-1) was put in an oven at 150° C. and held at 150° C. for 60 minutes. The fluorinated polymer (F2-1) was taken out from the oven and cooled to 25° C. at a rate of 100° C./min.

In the same manner as in Ex. 8, acid form fluorinated polymer (H2-1) was obtained, and then a liquid composition was obtained.

Ex. 10

The same heat treatment as in Ex. 8 was carried out except that fluorinated polymer (F2-2) was used.

In the same manner as in Ex. 1 except that the fluorinated polymer (F2-2) was used, acid form fluorinated polymer (H2-2) was obtained.

22 g of acid form fluorinated polymer (H2-2) was added to a mixed liquid comprising 37 g of ultrapure water and 37 g of ethanol with stirring. The temperature was increased so that the internal temperature would be 110° C., followed by stirring at 110° C. for 6 hours, and 51 g of ultrapure water was injected by pressure with nitrogen, followed by stirring further for 2 hours, and then by cooling. After cooling, filtration through a filter was conducted to obtain a liquid composition.

Ex. 11

The same heat treatment as in Ex. 9 was carried out except that fluorinated polymer (F2-2) was used. In the same manner as in Ex. 10, acid form fluorinated polymer (H2-2) was obtained, and then a liquid composition was obtained.

Ex. 12

Fluorinated polymer (F1-1) was charged into an extruder and held at 200° C. for 30 minutes. The fluorinated polymer (F1-1) in a melt state was extruded from a die heated to 200° C. having a pore with a diameter of 4 mm, pulled at a rate slightly higher than the extrusion rate, rapidly cooled at a rate of 400° C./min and cut by a pelletizer to obtain pellets of the fluorinated polymer (F1-1) having a diameter of the cross section of from 1 to 3 mm and a length of from 5 to 20 mm.

In the same manner as in Ex. 1 except that the pellets of the fluorinated polymer (F1-1) were used, acid form fluorinated polymer (H1-1) was obtained, and then a liquid composition was obtained.

Ex. 13

Fluorinated polymer (F1-1) was put in an oven at 200° C. and heated into a melt state, and held at 200° C. for 180 minutes. The setting of the oven was changed to cool the fluorinated polymer (F1-1) to 25° C. at a cooling rate of 50° C./min.

In the same manner as in Ex. 1, acid form fluorinated polymer (H1-1) was obtained, and then a liquid composition was obtained.

Ex. 14

Fluorinated polymer (F1-1) was put in an oven at 200° C. and heated into a melt state, and held at 200° C. for 180 minutes.

The setting of the oven was changed to cool the fluorinated polymer (F1-1) to 25° C. at a cooling rate of 5° C./min.

In the same manner as in Ex. 1, acid form fluorinated polymer (H1-1) was obtained, and then a liquid composition was obtained.

Ex. 15

Fluorinated polymer (F1-1) was put in an oven at 240° C. and heated into a melt state, and held at 240° C. for 180 minutes. The setting of the oven was changed to cool the fluorinated polymer (F1-1) to 150° C. at a cooling rate of 25° C./min, and the fluorinated polymer (F1-1) was held at 150° C. for 30 minutes. The setting of the oven was further changed to cool the fluorinated polymer (F1-1) to 25° C. at a cooling rate of 40° C./min.

In the same manner as in Ex. 1, acid form fluorinated polymer (H1-1) was obtained, and then a liquid composition was obtained.

Ex. 16

Fluorinated polymer (F1-1) was put in an oven at 240° C. and heated into a melt state, and held at 240° C. for 180 minutes. The setting of the oven was changed to cool the fluorinated polymer (F1-1) to 120° C. at a cooling rate of 25° C./min, and the fluorinated polymer (F1-1) was held at 120° C. for 30 minutes. The fluorinated polymer (F1-1) was taken out from the oven and cooled to 25° C. at a cooling rate of 100° C./min.

In the same manner as in Ex. 1, acid form fluorinated polymer (H1-1) was obtained, and then a liquid composition was obtained.

Ex. 17

Fluorinated polymer (F1-1) was put in an oven at 150° C. and held at 150° C. for 60 minutes. The setting of the oven was changed to cool the fluorinated polymer (F1-1) to 25° C. at a cooling rate of 25° C./min.

In the same manner as in Ex. 1, acid form fluorinated polymer (H1-1) was obtained, and then a liquid composition was obtained.

Ex. 18

Fluorinated polymer (F1-2) was put in an oven at 140° C. and held at 140° C. for 60 minutes. The setting of the oven was changed to cool the fluorinated polymer (F1-2) to 25° C. at a cooling rate of 40° C./min.

In the same manner as in Ex. 1, acid form fluorinated polymer (H1-2) was obtained, and then a liquid composition was obtained.

Ex. 19

In the same manner as in Ex. 12 except that fluorinated polymer (F1-2) was used instead of fluorinated polymer (F1-1), a liquid composition was obtained.

Ex. 20

Fluorinated polymer (F2-1) was put in an oven at 240° C. and heated into a melt state, and held at 240° C. for 180 minutes. The setting of the oven was changed to cool the fluorinated polymer (F2-1) to 25° C. at a cooling rate of 5° C./min.

In the same manner as in Ex. 8, acid form fluorinated polymer (H2-1) was obtained, and then a liquid composition was obtained.

Ex. 21

In the same manner as in Ex. 8 except that the holding temperature was 120° C. instead of 150° C., a liquid composition was obtained.

Ex. 22

The same heat treatment as in Ex. 20 was carried out except that fluorinated polymer (F2-2) was used. In the same manner as in Ex. 10, acid form fluorinated polymer (H2-2) was obtained, and then a liquid composition was obtained.

Ex. 23

In the same manner as in Ex. 10 except that the holding temperature was 120° C. instead of 150° C., a liquid composition was obtained.

TABLE 1

| Ex | Fluorinated polymer (F) Type | Ion exchange capacity [meq/g] | TQ value [° C.] | Heat treatment method Process | Melting temperature [° C.] | Melting time [min] | First cooling rate [° C./min] | Holding temperature [° C.] |
|---|---|---|---|---|---|---|---|---|
| 1 | (F1-1) | 1.1 | 220 | β | 240 | 180 | 5 | 140 |
| 2 | (F1-1) | 1.1 | 220 | β | 200 | 180 | 25 | 160 |
| 3 | (F1-1) | 1.1 | 220 | α | — | — | — | 160 |
| 4 | (F1-1) | 1.1 | 220 | α | — | — | — | 150 |
| 5 | (F1-1) | 1.1 | 220 | α, β | 240 | 180 | 50 | 150 |
| 6 | (F1-2) | 1.26 | 232 | β | 240 | 180 | 5 | 140 |
| 7 | (F1-2) | 1.26 | 232 | α | — | — | — | 140 |
| 8 | (F2-1) | 1.52 | 245 | β | 240 | 180 | 5 | 150 |
| 9 | (F2-1) | 1.52 | 245 | α | — | — | — | 150 |
| 10 | (F2-2) | 1.95 | 240 | β | 240 | 180 | 5 | 150 |
| 11 | (F2-2) | 1.95 | 240 | α | — | — | — | 150 |
| 12 | (F1-1) | 1.1 | 220 | — | 200 | 30 | 400 | — |
| 13 | (F1-1) | 1.1 | 220 | — | 200 | 180 | 50 | — |
| 14 | (F1-1) | 1.1 | 220 | — | 200 | 180 | 5 | — |
| 15 | (F1-1) | 1.1 | 220 | — | 240 | 180 | 25 | 150 |
| 16 | (F1-1) | 1.1 | 220 | — | 240 | 180 | 25 | 120 |
| 17 | (F1-1) | 1.1 | 220 | — | — | — | — | 150 |
| 18 | (F1-2) | 1.26 | 232 | — | — | — | — | 140 |
| 19 | (F1-2) | 1.26 | 232 | — | 200 | 30 | 400 | — |
| 20 | (F2-1) | 1.52 | 245 | — | 240 | 180 | 5 | — |
| 21 | (F2-1) | 1.52 | 245 | — | 240 | 180 | 5 | 120 |
| 22 | (F2-2) | 1.95 | 240 | — | 240 | 180 | 5 | — |
| 23 | (F2-2) | 1.95 | 240 | — | 240 | 180 | 5 | 120 |

| Ex | Heat treatment method Holding time [min] | Second cooling rate [° C./min] | Holding time at 140 to 160° C. [min] | Starting temperature of cooling at 50° C./min or higher [° C.] | Clogging of filter Pore size 0.5 μm | Clogging of filter Pore size 0.2 μm |
|---|---|---|---|---|---|---|
| 1 | 10 | 100 | 14 | 140 | ◉ | ○ |
| 2 | 30 | 50 | 30.4 | 160 | ◉ | ○ |
| 3 | 60 | 100 | 60.2 | 160 | ◉ | ○ |
| 4 | 60 | 50 | 60.2 | 150 | ◉ | ◉ |
| 5 | 60 | 100 | 60.3 | 150 | ◉ | ◉ |
| 6 | 10 | 100 | 14 | 140 | ◉ | ○ |
| 7 | 60 | 100 | 60 | 140 | ◉ | ○ |
| 8 | 30 | 100 | 32.1 | 150 | ◉ | ○ |
| 9 | 60 | 100 | 60.1 | 150 | ◉ | ○ |
| 10 | 30 | 100 | 32.1 | 150 | ◉ | ◉ |
| 11 | 60 | 100 | 60.1 | 150 | ◉ | ◉ |
| 12 | — | — | 0.05 | 200 | ○ | X |
| 13 | — | — | 0.4 | 200 | ○ | X |
| 14 | — | — | 4 | — | X | X |
| 15 | 30 | 40 | 30.65 | — | X | X |
| 16 | 30 | 100 | 0.8 | 120 | X | X |
| 17 | 60 | 25 | 60.4 | — | X | X |
| 18 | 60 | 40 | 60 | — | X | X |
| 19 | — | — | 0.05 | 200 | ○ | X |
| 20 | — | — | 4 | — | X | X |
| 21 | 30 | 100 | 4 | 120 | ○ | X |
| 22 | — | — | 4 | — | ○ | X |
| 23 | 30 | 100 | 4 | 120 | ○ | X |

In Ex. 1 to 11, since the fluorinated polymer (F) was held at from 140 to 160° C. for at least a predetermined time and then cooled to less than 110° C. at a rate of at least 50° C./min, a liquid composition having a fluorinated polymer (H) obtained by converting —SO$_2$F groups in the fluorinated polymer (F) to ion exchange groups dispersed in a liquid medium, was less likely to cause clogging of a filter.

In Ex. 12 to 23, since the fluorinated polymer (F) was not held at from 140 to 160° C. for at least a predetermined time, or even held at from 140 to 160° C. for at least a predetermined time, it was not cooled at a rate of at least 50° C./min, a liquid composition having a fluorinated polymer (H) obtained by converting —SO$_2$F groups in the fluorinated polymer (F) to ion exchange groups dispersed in a liquid medium, was likely to cause clogging of a filter.

INDUSTRIAL APPLICABILITY

The liquid composition of the present invention is useful as a raw material for formation of a catalyst layer or a polymer electrolyte membrane in a membrane/electrode assembly.

REFERENCE SYMBOLS

10: Membrane/electrode assembly, 11: catalyst layer, 12: gas diffusion layer, 13: anode, 14: cathode, 15: polymer electrolyte membrane, 16: carbon layer.

What is claimed is:

1. A process for producing a liquid composition, which comprises
    holding a fluorinated polymer having —SO$_2$F groups at from 140 to 160° C. for at least 45 minutes,
    cooling it to less than 110° C. at a rate of at least 50° C./min,
    converting the —SO$_2$F groups in the fluorinated polymer to ion exchange groups to obtain a fluorinated polymer having ion exchange groups, and
    mixing the fluorinated polymer having ion exchange groups and a liquid medium.

2. A process for producing a liquid composition, which comprises
    cooling a fluorinated polymer having —SO$_2$F groups in a melt state to from 140 to 160° C. and holding it at from 140 to 160° C. for at least 10 minutes,
    cooling it to less than 110° C. at a rate of at least 50° C./min,
    converting the —SO$_2$F groups in the fluorinated polymer to ion exchange groups to obtain a fluorinated polymer having ion exchange groups, and
    mixing the fluorinated polymer having ion exchange groups and a liquid medium.

3. The process for producing a liquid composition according to claim 1, wherein the fluorinated polymer having —SO$_2$F groups has either one or both of structural units represented by the following formula (u1) and structural units represented by the following formula (u2), and structural units derived from tetrafluoroethylene:

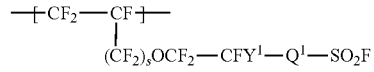
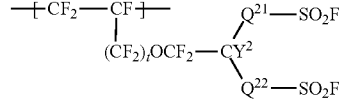

wherein Q$^1$ is a single bond or a perfluoroalkylene group which may have an etheric oxygen atom, Y$^1$ is a fluorine atom or a monovalent perfluoroorganic group, s is 0 or 1; Q$^{21}$ is a pefluoroalkylene group which optionally having an etheric oxygen atom, Q$^{22}$ is a single bond or a perfluoroalkylene group which optionally having an etheric oxygen atom, Y$^2$ is a fluorine atom or a monovalent perfluoroorganic group, and t is 0 or 1.

4. The process for producing a liquid composition according to claim 3, wherein the fluorinated polymer having ion exchange groups has an ion exchange capacity of from 0.5 to 1.8 meq/g dry resin when it has structural units represented by the formula (u1) and has no structural units represented by the formula (u2), or from 0.5 to 2.8 meq/g dry resin when it has structural units represented by the formula (u2).

5. The process for producing a liquid composition according to claim 1, wherein the TQ value of the fluorinated polymer having —SO$_2$F groups is from 150 to 350° C.

6. A process for producing a catalyst layer-forming coating liquid, which comprises preparing a liquid composition by the process for producing a liquid composition as defined in claim 1, subjecting the liquid composition to filtration through a filter, and mixing the liquid composition subjected to filtration through a filter and a catalyst to prepare a catalyst layer-forming coating liquid.

\* \* \* \* \*